United States Patent [19]

Chen et al.

[11] Patent Number: 5,228,362
[45] Date of Patent: Jul. 20, 1993

[54] VEHICLE STEERING WHEEL STRUCTURE

[75] Inventors: Benjamin S. Chen; Michael Mahrous, both of Bloomfield Hills, Mich.

[73] Assignee: Chrysler Corporation, Highland Park, Mich.

[21] Appl. No.: 904,622

[22] Filed: Jun. 26, 1992

[51] Int. Cl.⁵ .................. B62D 1/04; G05G 1/10; B62R 21/16
[52] U.S. Cl. ..................................... 74/552; 280/731; 280/743; 200/61.55
[58] Field of Search ................. 74/552; D12/175, 176; 280/731, 743, 750; 200/61.55, 61.56, 61.57

[56] References Cited

U.S. PATENT DOCUMENTS

| | | | |
|---|---|---|---|
| 4,644,817 | 2/1987 | Albrecht et al. | 74/552 |
| 4,655,101 | 4/1987 | Endo et al. | 74/552 |
| 4,712,446 | 12/1987 | Kamata et al. | 74/552 X |
| 4,785,144 | 11/1988 | Fosnaugh et al. | 280/731 X |
| 5,056,814 | 10/1991 | Shiraki et al. | 280/743 X |
| 5,069,477 | 12/1991 | Shiraki | 280/743 X |
| 5,131,677 | 7/1992 | Horiuchi et al. | 280/731 |
| 5,176,400 | 1/1993 | McGuire et al. | 280/731 X |

FOREIGN PATENT DOCUMENTS 2242871 10/1991 United Kingdom ................ 280/731

Primary Examiner—Vinh T. Luong
Attorney, Agent, or Firm—Edward A. Craig

[57] ABSTRACT

A vehicle steering wheel has an armature which defines a structural circular steering wheel. The armature has a depressed central body portion providing a well for an air bag canister. A center pad which supports the air bag canister in the well extends across the well between the spokes, with a gap between each spoke and the edge of the pad. A spacer is provided between each spoke and the edge of the center pad so that the gaps are of equal width. The air bag canister is mounted to the body portion of the steering wheel by pins extending through openings in the body portion and conical springs surrounding the pins. The openings are substantially larger in diameter than the pins to permit the pins to shift radially and facilitate exact centering of the pad with respect to the spokes to maintain the gaps of uniform width. This mounting of the canister also accommodates shifting of the canister when a marginal portion of the center pad is depressed to close a horn switch and sound the horn. The springs, being conical, urge the pins to a centered, at-rest position with respect to the openings even when the springs are distorted by radial shifting of the pins.

6 Claims, 2 Drawing Sheets

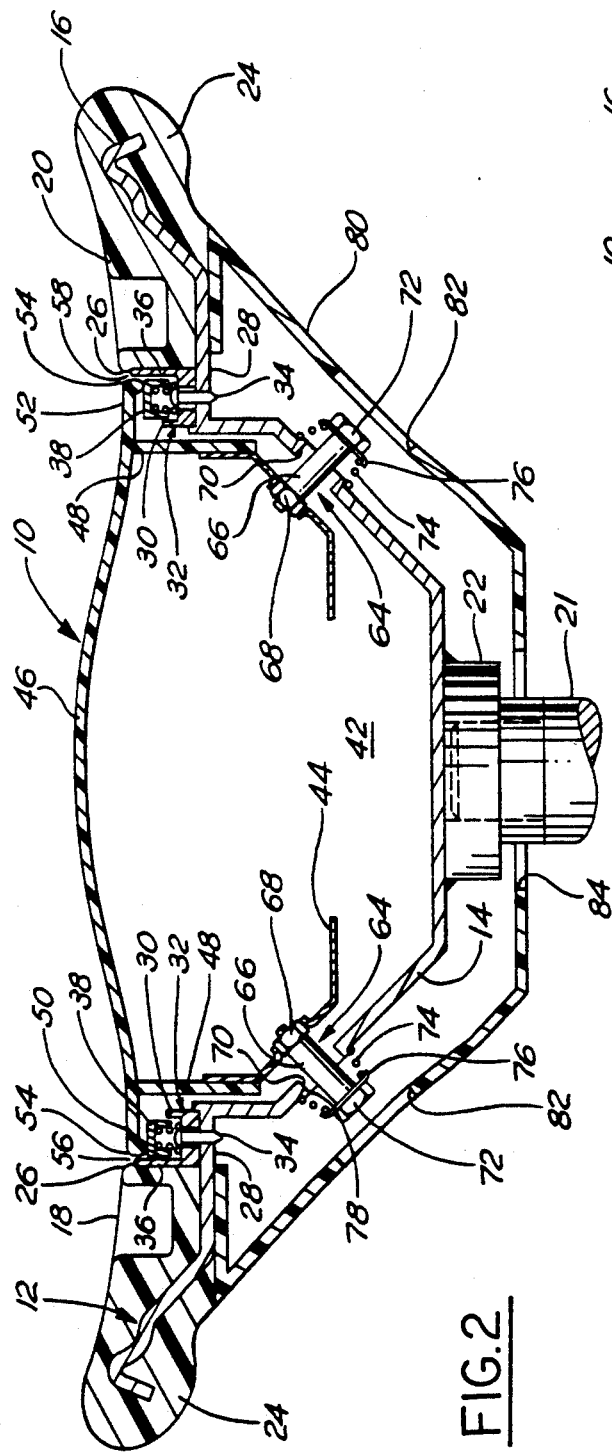
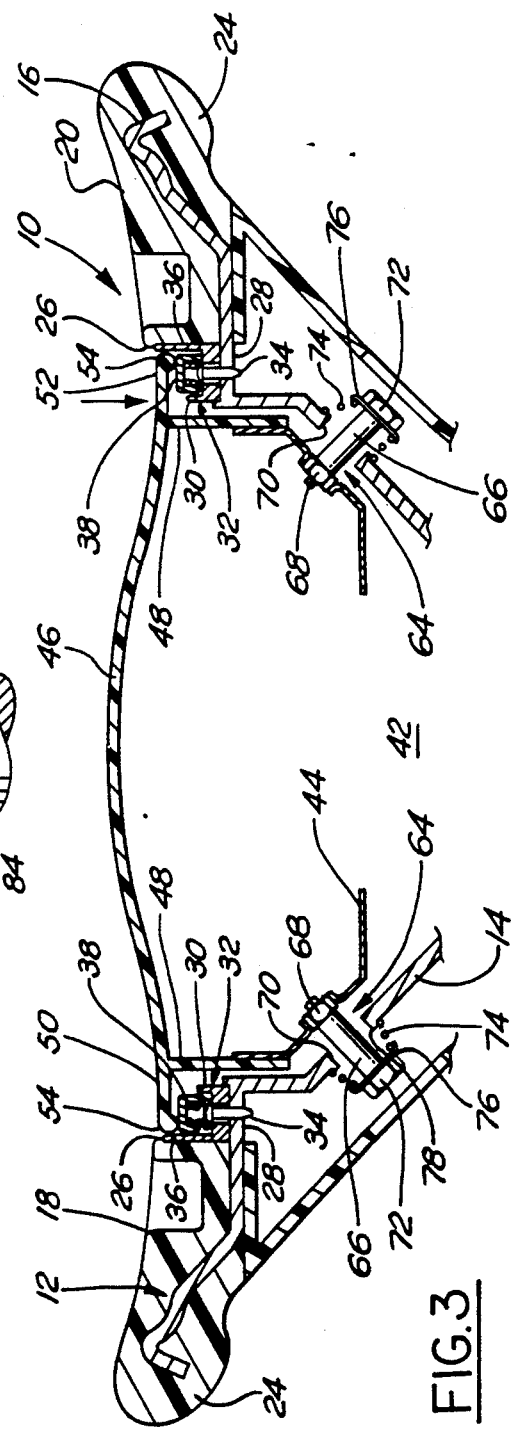

VEHICLE STEERING WHEEL STRUCTURE

FIELD OF THE INVENTION

This invention relates generally to vehicle steering wheels and refers more particularly to a vehicle steering wheel of the type carrying an air bag.

SUMMARY OF THE INVENTION

The steering wheel of this invention has an armature which defines a structural circular steering wheel. The armature has a depressed central body portion which provides a well to receive an air bag canister.

A center pad which supports the air bag canister in the well extends across the well between the spokes with a gap between each spoke and the edge of the pad. It is very important, from the standpoint of appearance, that these gaps are of uniform width. However, exact uniformity has been difficult to achieve because of dimensional variations in the overall structure, including the parts employed and the mounting of the parts.

In accordance with a preferred embodiment, a spacer is provided between each spoke and the outer edges of the center pad. These spacers are equal in width so that the gaps will be equal. The air bag canister is mounted to the steering wheel armature by pins which extend through enlarged openings in the body portion of the armature and coil springs which encircle the pins. The openings are substantially larger than the pins and permit the pins to shift radially to facilitate exact centering of the center pad with respect to the spokes to maintain gaps of uniform width between the center pad and the spokes. The pins are retained in position by the coil springs which are conical and urge the pins to an at-rest position centered with respect to the openings. The conical springs continue to be operative even when distorted radially as a consequence of radial shifting of the pins.

It is an object of this invention to provide a vehicle steering wheel structure having the foregoing features.

It is a further object of the invention to provide a vehicle steering wheel structure which is rugged and durable, composed of a relatively few simple parts, and capable of easy manufacture and assembly.

Other objects, features and advantages of the invention will become more apparent as the following description proceeds, especially when considered with the accompanying drawings.

BRIEF DESCRIPTION OF THE DRAWING

FIG. 2 is a sectional view taken on the line 2—2 in FIG. 1.

FIG. 3 is a view similar to FIG. 2 but shows the position of the parts when one marginal edge portion of the center pad is depressed to operate the horn.

DETAILED DESCRIPTION

Figure 1:
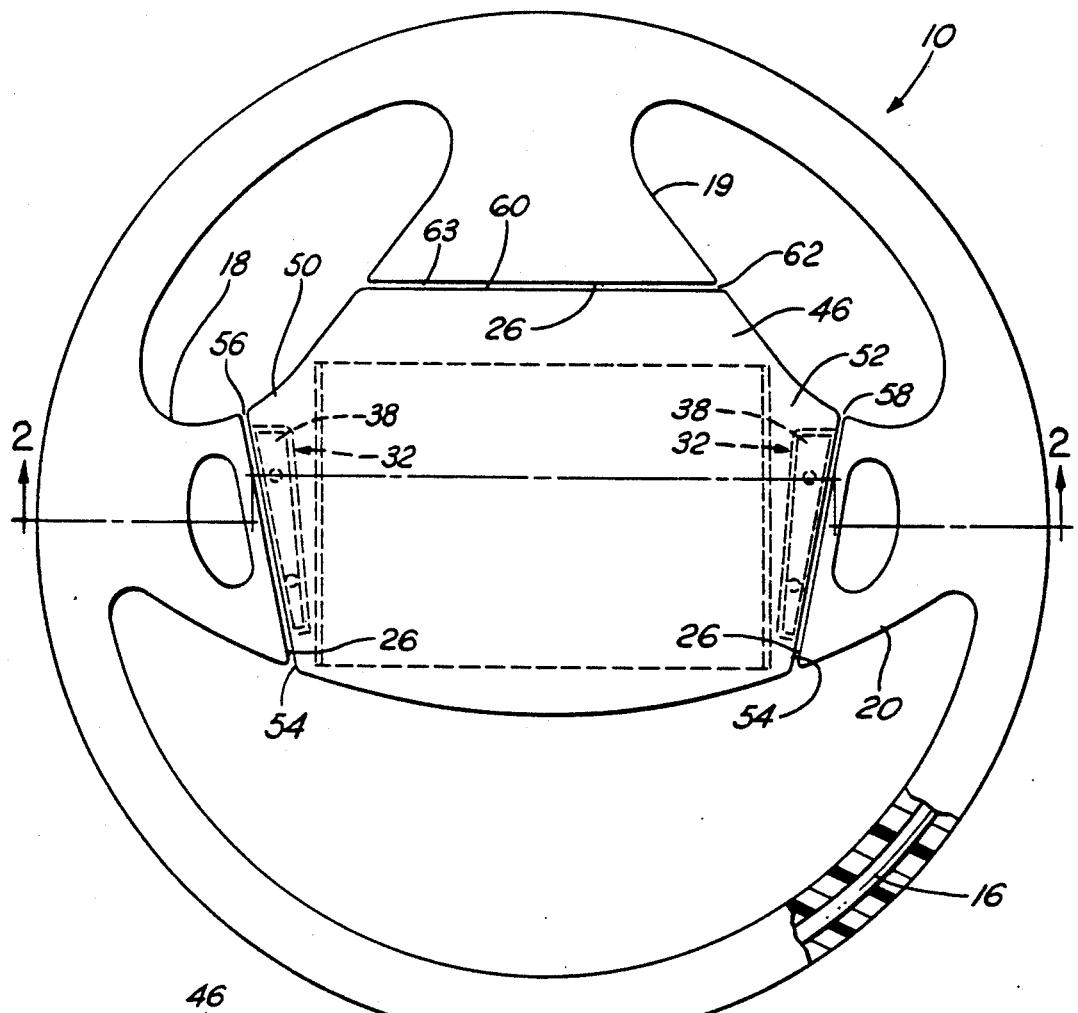
FIG. 1 is a plan view of a vehicle steering wheel structure constructed in accordance with the invention.
Figure 4:
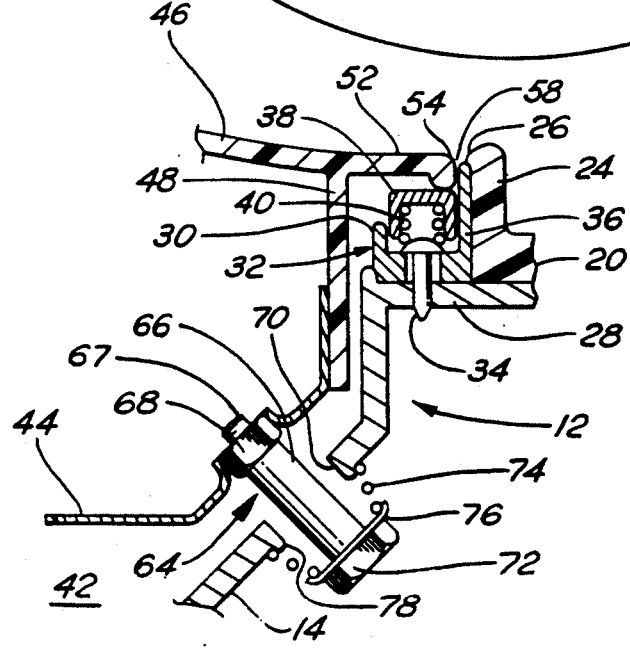
FIG. 4 is a fragmentary sectional view showing a portion of the structure in FIG. 2.

Referring now more particularly to the drawings, the steering wheel structure 10 comprises an armature 12 of aluminum, for example, which has a body portion 14, a ring portion 16 encircling the body portion, and angularly spaced, generally radial spokes 18, 19 and 20 extending between the body portion and the ring portion. The body portion 14 is connected to the steering mechanism (not shown) by a shaft 21 and coupling 22. The ring portion and spokes are preferably covered with a soft layer or skin 24 of vinyl or urethane, for example. The inner edges 26 of the cover 24 on the spokes defines the inner margins of the spokes.

Extending radially inwardly of the spokes 18 and 20 are the horn switch seats 28. On each seat 28 is mounted a channel 30 which constitutes the stationary part of a horn switch 32. The base of the channel 30 rests upon the seat and is secured thereto by fasteners 34. One side wall 36 of the channel is disposed flush against and in surface-to-surface contact with the inner edge 26 of the spoke cover 24. The movable part 38 of the horn switch is an inverted channel that fits within channel 30 for sliding movement toward and away from the base of channel 30 against the action of the compression spring 40. When the movable part 38 is depressed, the horn is sounded.

The body portion 14 of the armature is centrally depressed relative to the ring portion 16 and spokes 18-20 to provide a well 42.

An air bag canister 44 mounted in the well 42 is a generally dish-shaped member or shell and is adapted to contain an air bag. A center pad 46 of vinyl or like material closes the top of the canister and has depending flanges 48 which are secured by any suitable means to the outer edges of the canister. This center pad 46 extends across the top of the well between the spokes an has marginal portions 50 and 52 extending outwardly of flanges 48 which overlie the horn switches 32 and terminate in outer edges 54 adjacent to the inner edges 26 of the spokes 18 and 20 to provide gaps 56 and 58 therebetween. A marginal portion of the pad also has an outer edge 60 adjacent to the inner edge 26 of the spoke 19 likewise providing a gap 62 therebetween. The upper portion of the side wall 36 of the channel 30 provides a spacer for spacing the marginal edges 54 of the pad from the inner ends of the spokes 18 and 20. A similar spacer 63 is provided between the marginal edge 60 of the pad and the inner edge of spoke 19. These spacers are of the same width so that all three gaps 56, 58 and 62 are the same width, which is very important from the standpoint of appearance.

The canister 44 is secured to the body portion 14 the armature. As seen in the drawings, at least one and preferably two or more spaced, elongated pins 64 are provided. One end of each pin is secured to the canister. The pin has a threaded reduced end 67 on shank 66 which threads into a nut 68 secured as by welding in a hole in the canister. The shank 66 extends outwardly from the canister and through an enlarged opening 70 in the body portion 14 of the armature. The head 72 of the bolt is disposed on the outer side of the body portion 14. Openings 70 are smaller in diameter than the heads 72 to prevent removal of the canister 44 from the steering wheel. A conical compression coil spring 74 encircles the shank 66 of each pin, having the small end bearing against a washer 76 encircling the shank and seated against the head 72. The large end of the coil spring bears upon the body portion 14 of the armature around the opening 70 through which the pin extends. The inner margin of the body portion 14 around each opening 70 is thickened to provide a ring-like retainer formation 78 which extends within the endmost coil of the spring 74 to prevent the spring from shifting. The diameter of the openings 70 is substantially larger than the diameter of the pin shanks 66 to permit the pins to shift radially to facilitate exact centering of the center pad 46 with respect to the spokes to maintain the gaps between the center pad and spokes of uniform width. The springs 74 retain the pins in position within openings 70. The springs 74, being conical, urge the pins to an at-rest position, centered with respect to openings 70 and continue to do so even when distorted radially as a result of radial shifting of the pins.

The marginal portion 50 or 52 of the center pad is depressed to operate one of the horn switches. When one margin of the center pad is depressed to operate the horn, the pins may shift their position within the openings 70 in the body portion of the armature. This can be seen in FIG. 3 where the righthand pin has shifted to a position closer to one side of the opening 70 than the other.

A backshroud 80 is provided which is a generally panshaped member secured to the armature 12 to cover the rear side of the body portion 14 of the wheel structure. Enlarged openings 82 are provided in the backshroud to permit access to the pins 64 and springs 74 which mount the air bag canister, and a central opening 84 clears the shaft 21.

We claim:

1. In combination, a steering wheel having a body portion, a ring portion encircling said body portion in radially spaced relation thereto, angularly spaced generally radial spokes extending between said ring portion and said body portion, said spokes having radially inner ends, said body portion being depressed centrally relative to said ring portion and spokes to provide a well, an air bag canister disposed in said well and adapted to contain an air bag, said canister including a pad extending across said well between said spokes, said pad having marginal portions terminating in outer edges adjacent to the radially inner ends of said spokes to provide gaps therebetween, spacers engaged with said outer edges of said marginal portions of said pad to maintain said gaps substantially equal, and means mounting said canister to said body portion of said steering wheel comprising spaced pins connected adjacent one end to said body portion, said body portion having openings through which said respective pins extend, each pin having a head at the opposite end thereof, and a coil spring encircling each of said pins having one end abutting said head and the other end abutting said body portion around an opening through which said pin extends, said openings being substantially larger in diameter than said pins to permit said pins to shift radially and facilitate exact centering of said pad with respect to said spokes to maintain said gaps equal in width, said coil springs being conical and urging said pins to an at-rest position even when distorted radially due to radial shifting of said pins.

2. A combination as defined in claim 1, and further including horn switches mounted on said wheel adjacent to said radially inner ends of said spokes, said marginal portions of said pad overlying said horn switches, said horn switches being operated by depressing the overlying marginal portions of said pad.

3. A combination as defined in claim 2, wherein said horn switches each have a mounting channel including a wall, said walls being of equal thickness and constituting said spacers.

4. A combination as defined in claim 1, wherein said conical coil springs each have a large end and a small end, each coil spring having the large end thereof abutting said body portion and the small end thereof abutting said pin heads, said pins being retained in position by said conical springs, said openings in said body portion being smaller than said pin heads to prevent removal of said canister from said steering wheel.

5. A combination as defined in claim 4, and further including horn switches mounted on said wheel adjacent to said radially inner ends of said spokes, said marginal portions of said pad overlying said horn switches, said horn switches being operable by depressing the overlying marginal portions of said pad, said horn switches each having a mounting channel including a side wall, said side walls being of equal thickness and constituting said spacers.

6. A combination as defined in claim 5, wherein said pins have threaded shanks, and further comprising nuts mounted on said canister with which said respective pin shanks are threadedly engaged to provide said connection of said pins to said canister.

* * * * *